No. 643,678. Patented Feb. 20, 1900.
S. R. PERRY.
WATER CYCLE.
(Application filed Dec. 17, 1898.)

(No Model.)

Witnesses
Inventor
Sylvester R. Perry,
by O'Mara & Co.
Attorneys

United States Patent Office.

SYLVESTER R. PERRY, OF WORCESTER, MASSACHUSETTS.

WATER-CYCLE.

SPECIFICATION forming part of Letters Patent No. 643,678, dated February 20, 1900.

Application filed December 17, 1898. Serial No. 699,569. (No model.)

*To all whom it may concern:*

Be it known that I, SYLVESTER R. PERRY, a resident of Worcester, in the county of Worcester and State of Massachusetts, have invented a new and useful Water-Cycle, of which the following is a specification.

This invention is a new and useful construction of water-cycle, the object being to provide a device in which the motive power for propelling the vessel can be supplied by the ordinary safety-bicycle now in use; and with this object in view the invention consists in the peculiar construction of the various parts and in their novel combination and arrangement, all of which will be fully described hereinafter and pointed out in the appended claims.

Figure 1:
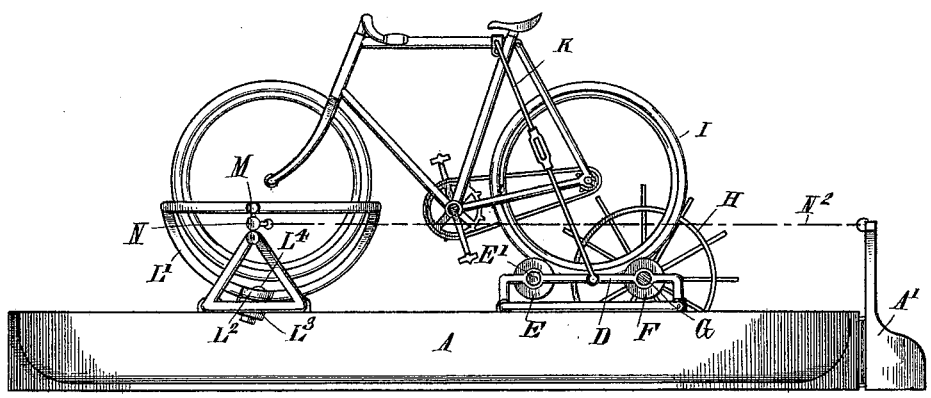
Figure 2:
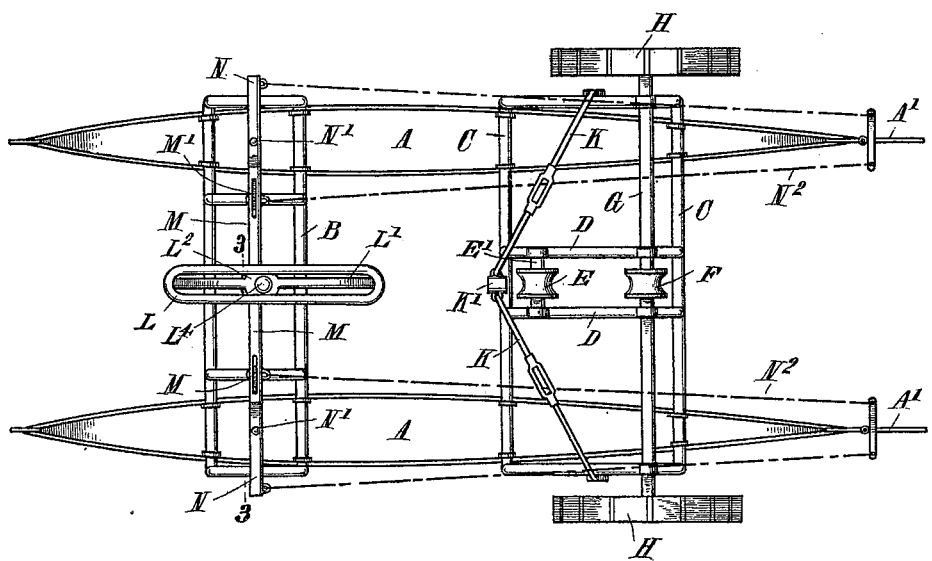
Figure 3:
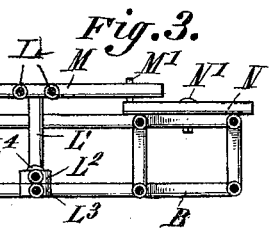

In the drawings forming part of this specification, Figure 1 is a side elevation of a water-cycle constructed in accordance with my invention with one of the propelling-wheels removed. Fig. 2 is a top plan view, the cycle being removed; and Fig. 3 is a detail view on the line 3 3 of Fig. 2, showing the mechanism for operating the rudders.

In carrying out my invention I employ two hulls or floats A, which are made quite narrow and are provided with rudders A' at their rear ends, said rudders being of the usual construction. The hulls A are connected adjacent to their forward ends by means of a frame B and near their rear ends by means of a frame C, said frames being essentially rectangular in shape and made from light tubing. The frame C has two parallel members D extending across the same, said bars or members being arranged substantially along opposite sides of the longitudinal center of the device, and between said bars are mounted the grooved pulley-wheels E and F, the pulley-wheel E being mounted upon a shaft E', while the pulley F is mounted upon a shaft G, which extends beyond the frame C at each end and is also journaled in the ends of said frame, and paddle-wheels H are mounted upon the ends of said shaft. The pulley-wheels E and F are grooved to receive the rear wheel I of the ordinary safety-bicycle, said bicycle being held in place by the tie-rods K, connected to the ends of the frame C and provided with a collar K', adapted to fit around the top bar of the bicycle-frame.

It will thus be understood that by back-pedaling the cranks the rear wheel of the bicycle is revolved by the ordinary crank-and-chain mechanism and the pulley-wheel F will be revolved and drive the paddle-wheels which propel the cycle along, the pulley-wheel E in this instance acting merely as a guide-wheel for holding the rear wheel of the bicycle in operative position against the pulley-wheel F. The front wheel of the bicycle rests within a frame comprising the oval portion L and the depending arched bar L', said bar L' having one half of a turn-table $L^2$ mounted thereon, which is adapted to rest upon the other half $L^3$, mounted upon a bar connecting the members of the frame B, said sections of the turn-table being connected by means of a pivotal bolt $L^4$, so that whenever the handle-bar of the bicycle is turned the front wheel will turn, and likewise the frame L, and in order to connect this frame L with the rudders I arrange laterally-projecting arms M extending from each side of the frame L, and tiller-arms N are pivotally mounted upon the frame C, as shown at N', and are connected at their opposite ends with the tiller-head of the adjacent rudder by means of cables or ropes $N^2$, and the inner ends of the arms N are pivotally connected to the arms M, as shown at M', the said arms M being slotted longitudinally in order to permit the pivot to move as the arms N turn upon their pivots N'. Thus it will be seen that when the handle-bar of the bicycle is turned to the right or left the frame L will be correspondingly turned and operate the arms M, which in turn cause the arms N to be moved upon their pivots and in parallel relation to each other, thereby insuring a uniform and parallel movement in the rudders. By this means the course of the cycle can be accurately governed. It will thus be seen that I provide simple and efficient means for the operation of the device by an ordinary bicycle and also provide for the control from the steering-head or handle-bar of said bicycle.

Having thus fully described my invention, what I claim as new, and desire to secure by Letters Patent of the United States, is—

1. In a water-cycle the combination with the floats of a front frame and a rectangular rear frame connecting said floats, of two transverse rods extending across the rear frame, an idle pulley journaled in said rods, a shaft extending longitudinally the rear frame and carrying paddle-wheels on its respective ends, a drive-pulley on said shaft in line with the idle pulley adapted to be driven by the rear wheel of a bicycle, a pivoted frame arranged upon the front frame and adapted to receive the front wheel of a bicycle, laterally-projecting arms extending from the said pivoted frame and slotted longitudinally at their outer ends, the tiller-arms pivoted upon the front frame and pivotally connected with the slotted arms, and the steering rods or cables connecting the tiller-arms and the rudders substantially as described.

2. In a water-cycle, the combination with the floats, of a rectangular front frame, and a rear frame connecting said floats, of the wheel-receiving frame L and a depending arched bar having one half of the turn-table mounted thereon, a second bar connecting the members of the front frame upon which the other half of the turn-table is mounted, the laterally-projecting arms slotted at their outer ends, the tiller-arms pivoted upon the front frame and pivotally connected with the slotted arms, and the steering cables or ropes connecting the tiller-arms and the rudders substantially as described.

SYLVESTER R. PERRY.

Witnesses:
WM. W. STACEY,
JAMES E. WILSON.